United States Patent
Onaka et al.

(10) Patent No.: US 11,623,696 B2
(45) Date of Patent: Apr. 11, 2023

(54) VEHICLE BONNET STRUCTURE

(71) Applicant: MAZDA MOTOR CORPORATION, Hiroshima (JP)

(72) Inventors: Yasuyuki Onaka, Aki-gun (JP); Shogo Okada, Aki-gun (JP); Yutaka Mitoma, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 193 days.

(21) Appl. No.: 17/179,243

(22) Filed: Feb. 18, 2021

(65) Prior Publication Data

US 2021/0300478 A1 Sep. 30, 2021

(30) Foreign Application Priority Data

Mar. 31, 2020 (JP) .............................. JP2020-064325

(51) Int. Cl.
*B62D 25/12* (2006.01)
*B62D 25/10* (2006.01)

(52) U.S. Cl.
CPC ........... *B62D 25/12* (2013.01); *B62D 25/105* (2013.01)

(58) Field of Classification Search
CPC .............................. B62D 25/105; B62D 25/12
See application file for complete search history.

(56) References Cited

U.S. PATENT DOCUMENTS 7,354,101 B2 * 4/2008 Donabedian ......... B62D 25/105
296/193.11

FOREIGN PATENT DOCUMENTS

JP 2016-060398 A 4/2016
JP 2016-060424 A 4/2016

* cited by examiner

*Primary Examiner* — Dennis H Pedder
*Assistant Examiner* — Melissa Ann Bonifazi
(74) *Attorney, Agent, or Firm* — Studebaker & Brackett PC

(57) ABSTRACT

A vehicle bonnet structure, having designability, dent resistance and reduced weight, includes an outer panel, an inner panel attached to a back face of this outer panel, and a stiffener disposed between a front portion of the outer panel and a front portion of the inner panel and supported on the inner panel. A first step portion is provided in a vehicle-width-direction inner-side area of the outer panel which extends in the front-rear direction and has a smaller up-down dimension on the front side than on the rear side. The stiffener includes a first sealer which abuts against the outer panel in an extension line vicinity area toward the front side of a boundary portion of the first step portion and suppresses downward displacement of the outer panel, and a first bead portion extending in the front-rear direction at a position in the vicinity of the first sealer.

20 Claims, 8 Drawing Sheets

VEHICLE BONNET STRUCTURE

BACKGROUND

Technical Field

The present disclosure relates to a vehicle bonnet structure and, in particular, relates to a vehicle bonnet structure including a reinforcement member disposed between a front portion of an outer panel and a front portion of an inner panel and supported on the inner panel.

Background Art

A bonnet structure has been conventionally known which includes a bonnet outer panel (hereinafter abbreviated as the outer panel) forming an outer plate of a bonnet that covers an engine room so as to be openable and closable, a bonnet inner panel (hereinafter abbreviated as the inner panel) disposed on the lower side of this outer panel and forming a space portion at a vehicle-width-direction center thereof in cooperation with the outer panel, and a lock mechanism supported on the inner panel. Since a space portion for attachment of a striker of the lock mechanism is formed at a vehicle-width-direction center front end portion of the bonnet, tensile rigidity of the outer panel becomes low. Thus, from the viewpoint of merchantability of the vehicle, a reinforcement member called a stiffener or a dent reinforcement is provided at a vehicle-width-direction center front end portion of the outer panel so as to secure dent resistance. The dent resistance is an evaluation criterion of deformation characteristics relating to, for example, a dent of a panel.

In an automobile bonnet structure of Japanese Patent Laid-Open No. 2016-060398, a rear portion of a bonnet having an outer panel and an inner panel is pivotally supported on a vehicle body via a hinge, a striker capable of engaging with the vehicle body side is provided at a front portion of the bonnet, and a stiffener including a pair of left and right vertical beads extending in the front-rear direction, a transverse bead extending in the left-right direction between the pair of these vertical beads, and an annular groove bead in a substantially annular shape along an outer peripheral edge of the stiffener is disposed across the inner panel.

Meanwhile, for the purpose of, for example, enhancing designability of a vehicle, a convex step portion projecting and extending in the front-rear direction or a concave step portion recessed and extending in the front-rear direction is sometimes formed at a vehicle-width-direction center portion of an outer panel. A vehicle-body structure of Japanese Patent Laid-Open No. 2016-060424 includes an engine room at a vehicle body rear portion on which an engine is mounted, and a bonnet that opens and closes an opening of an upper portion of this engine room, and, in an outer panel of the bonnet, a pair of left and right convex hoods gradually rising from rearward to frontward, and a concave hood disposed between the pair of these convex hoods and having a bottom face extending in the substantially horizontal direction are formed.

SUMMARY

In the vehicle-body structure of Japanese Patent Laid-Open No. 2016-060424, a pair of left and right ridges is formed which extends in the front-rear direction at vehicle-width-direction inner-side ends of the pair of convex hoods corresponding to a step portion, so to speak, in boundary areas between the convex hoods and the concave hood. These ridges are typically called character lines, which can greatly affect the impression of the body design according to the specifications of the ridges. The technology of Japanese Patent Laid-Open No. 2016-060424 can enhance designability of the vehicle but may deteriorate the dent resistance.

An outer plate component, in particular, a bonnet outer panel, has a large projected area, which allows to expect a weight reduction effect due to thickness reduction, but it has many opportunities to contact a hand or a body; accordingly, a required level for the dent resistance is high.

For example, when a downward load acts on a ridge formed at a vehicle body front-rear-direction center-side portion of a step portion, since the step portion itself has a corner, the load input point is less likely to buckle due to a high strengthening effect. Then, this downward load is propagated toward the vehicle body front-rear-direction distal end side on the ridge and intensively released in a distal end area in which the step portion (ridge) disappears, in other words, in a peripheral area of an extension line obtained by extending the ridge in which the high strengthening effect cannot be expected. Therefore, in a case where an outer panel including the step portion is reduced in thickness, in the outer panel, buckling in an extending manner in the vehicle width direction may occur in an area in which the ridge becomes smaller and in an area in which the ridge in the vicinity of the extension line is eliminated.

Namely, it is not easy to achieve both designability and dent resistance while reducing the weight of the bonnet.

Accordingly, the present disclosure provides, for example, a vehicle bonnet structure capable of achieving both designability and dent resistance while reducing the weight.

A vehicle bonnet structure includes an outer panel provided so as to cover a room from above and form an exterior design, the room being formed on at least one side of a vehicle cabin in the vehicle body front-rear direction. The vehicle bonnet structure also includes an inner panel attached to a back face of this outer panel, and a reinforcement member disposed between a vehicle body front-rear-direction close-to-distal end portion of the outer panel and a vehicle body front-rear-direction close-to-distal end portion of the inner panel and supported on the inner panel. In the vehicle bonnet structure, a step portion is, in a vehicle body front view, formed in a vehicle-width-direction inner-side area of the outer panel. The step portion extends in the vehicle body front-rear direction and is provided in such a manner that a step of the step portion becomes smaller toward the vehicle body front-rear-direction distal end side or the step is eliminated at the distal end. The reinforcement member includes a load receiving portion abutting against the step portion and the outer panel along an extension line toward the distal end side of the step portion to suppress downward displacement of the outer panel.

In this vehicle bonnet structure, the step portion is, in a vehicle body front view, formed in the vehicle-width-direction inner-side area of the outer panel. Also, the step portion extends in the vehicle body front-rear direction and is provided in such a manner that the step becomes smaller toward the vehicle body front-rear-direction distal end side or the step is eliminated at the distal end, so that a character line is formed in the outer panel, and designability of the vehicle can be enhanced.

The reinforcement member is provided with the load receiving portion which abuts against the step portion and the outer panel along the extension line toward the distal end side of the step portion and suppresses downward displacement of the outer panel, so that the inner panel can support, via the load receiving portion and the reinforcement member, a load propagated on a ridge of the step portion and intensively released in an extension line vicinity area obtained by extending the ridge of the step portion to the distal end side. Also, buckling of the outer panel in an extending manner in the vehicle width direction which occurs in the extension line vicinity area can be suppressed.

In the embodiment discussed above, the load receiving portion is a plurality of first mastic sealers. According to this configuration, support rigidity of the extension line vicinity area of the step portion can be secured by using the mastic sealer, which is a thermosetting synthetic resin adhesive.

In the embodiments discussed above, the reinforcement member includes a plurality of second mastic sealers abutting against the outer panel, and the first mastic sealer is smaller than the second mastic sealer. According to this configuration, the extension line vicinity area of the step portion can be supported by the first mastic sealer having a smaller displacement amount than the second mastic sealer, and the support rigidity of the extension line vicinity area at a boundary portion of the step portion can be further increased.

In the embodiments discussed above, the reinforcement member has a first bead portion extending in the vehicle body front-rear direction at a position in the vicinity of the plurality of first mastic sealers. According to this configuration, a load acting via the plurality of first mastic sealers can be firmly supported by using a bead effect of the first bead portion.

Also, in the embodiments discussed above, a vehicle-width-direction distance between the plurality of first mastic sealers and the first bead portion is set so as to become smaller toward the vehicle body front-rear-direction distal end side. According to this configuration, support rigidity of the plurality of first mastic sealers can be adjusted by using the vehicle-width-direction distance between the plurality of first mastic sealers and the first bead portion, and a load applied to the plurality of first mastic sealers can be equalized.

In the embodiments discussed above, the reinforcement member has a third mastic sealer. The third mastic sealer is disposed at a position substantially symmetrical to, of the plurality of first mastic sealers, a first mastic sealer disposed on the vehicle body front-rear-direction most distal end side of the first bead portion. According to this configuration, a portion most separated from the step portion in the front-rear direction and having low rigidity can be supported in a wide range in the vehicle width direction, and dent resistance can be enhanced.

Also, in the embodiments discussed above, a continuous frame-shaped second bead portion is formed at an outer peripheral edge of the reinforcement member, and a curved portion is formed at a vehicle body front-rear-direction distal end side portion of the second bead portion. The curved portion is curved toward the vehicle body front-rear-direction center side so as to bypass the first bead portion. According to this configuration, while the support rigidity of the first mastic sealer is maintained, rigidity of the reinforcement member can be secured.

According to the vehicle bonnet structure of the present disclosure, the vicinity area of the extension line obtained by extending the ridge of the step portion formed in the outer panel is supported by the inner panel, and thereby it is possible to achieve both designability and dent resistance while reducing the weight.

DETAILED DESCRIPTION

Hereinafter, a mode for carrying out the present disclosure will be described based on the drawings. The following description of a preferred embodiment is merely illustrative in nature and is not intended to limit the present disclosure, applications thereof, or use thereof.

Embodiment 1

Hereinafter, an embodiment 1 of the present disclosure will be described based on FIGS. 1 to 10.

Figure 1:
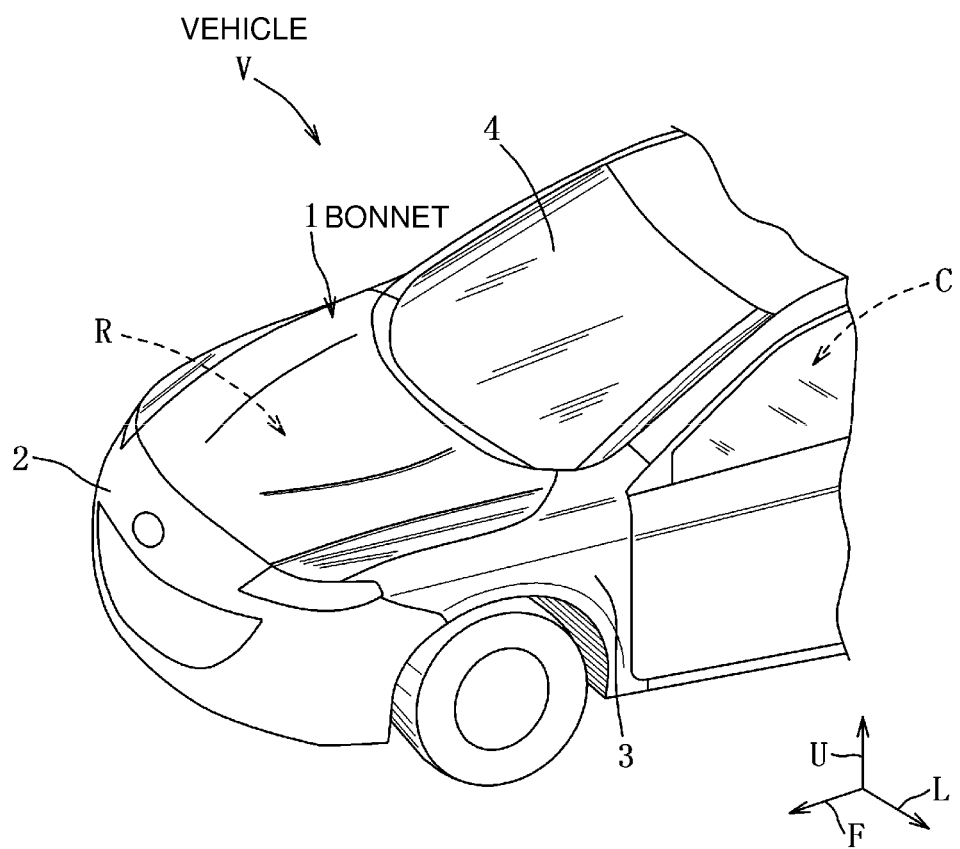
FIG. 1 is a front-side perspective view of a vehicle including a bonnet structure according to an embodiment.

As illustrated in FIG. 1, a vehicle V according to the present embodiment 1 includes a bonnet 1 that, in a freely openable and closable manner, covers the upper side of an engine room R formed on the front side of a vehicle cabin C for an occupant to get in. The engine room R is formed by a space defined by a front bumper 2 disposed at a vehicle body front end, a pair of left and right front fenders 3 respectively extending rearward from left and right ends of this front bumper 2, and a dash panel (illustration omitted) supporting a lower end of a windshield 4 and forming a front wall of the vehicle cabin. Hereinafter, description will be made in which, in the figures, the direction of arrow F indicates the front side; the direction of arrow L, the left side; the direction of arrow U, the upper side.

Figure 2:
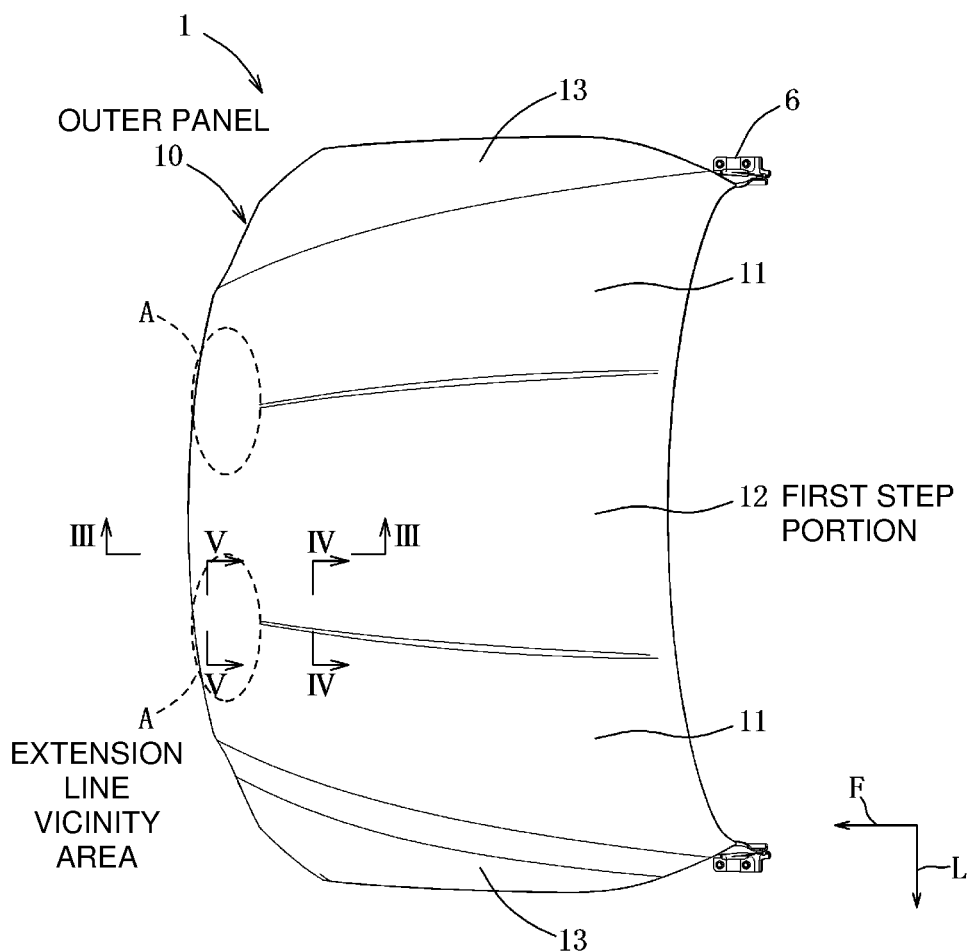
FIG. 2 is a plan view of a bonnet.
Figure 3:
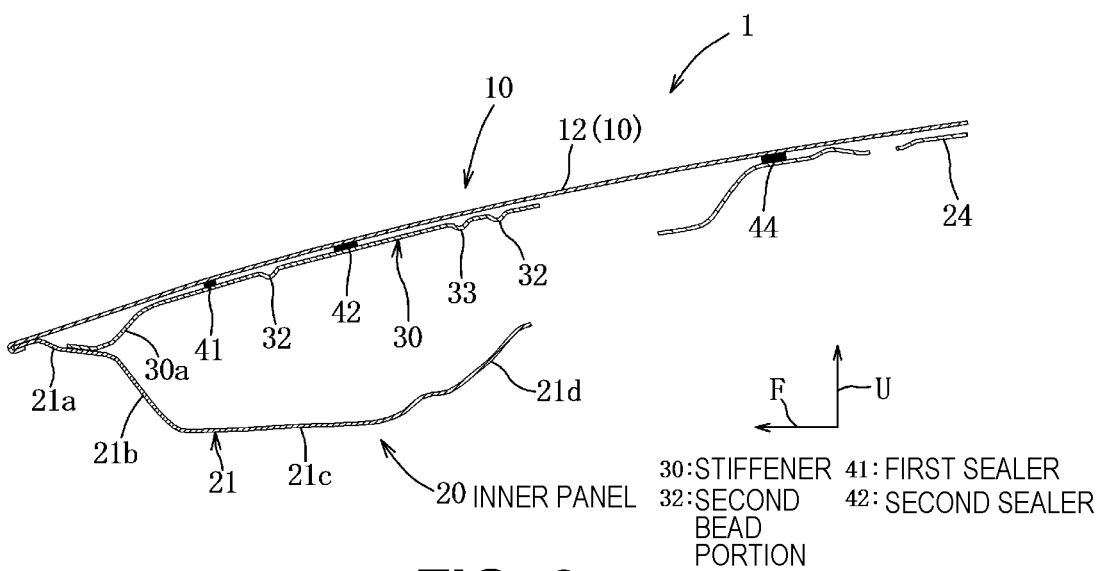
FIG. 3 is a cross-sectional view taken along line in FIG. 2.

The bonnet 1 is pivotally supported on the vehicle body via a pair of bonnet hinges 6 provided at left and right rear ends of the bonnet 1 and is configured so as to be capable of opening and closing an upper opening of the engine room R. As illustrated in FIGS. 2 and 3, the bonnet 1 includes, as main components, a bonnet outer panel (hereinafter abbreviated as the outer panel) 10 forming an exterior design of the vehicle V, a bonnet inner panel (hereinafter abbreviated as the inner panel) 20 disposed below this outer panel 10, and a stiffener 30 (reinforcement member) disposed between the outer panel 10 and the inner panel 20.

The outer panel 10 will be described.

The outer panel 10 is molded by, for example, pressing a steel plate material of about 0.65 mm. This outer panel 10 is disposed so as to face the inner panel 20, and an outer peripheral edge thereof is joined to the inner panel 20 by means of hemming so as to hold an outer peripheral edge of the inner panel 20. The outer panel 10 includes a flat base 11 forming a reference plane of this outer panel 10, a first step portion 12 (step portion) formed at a left-right-direction center portion of this base 11, and a pair of left and right second step portions 13 formed at left and right side portions of the base 11.

Figure 4:
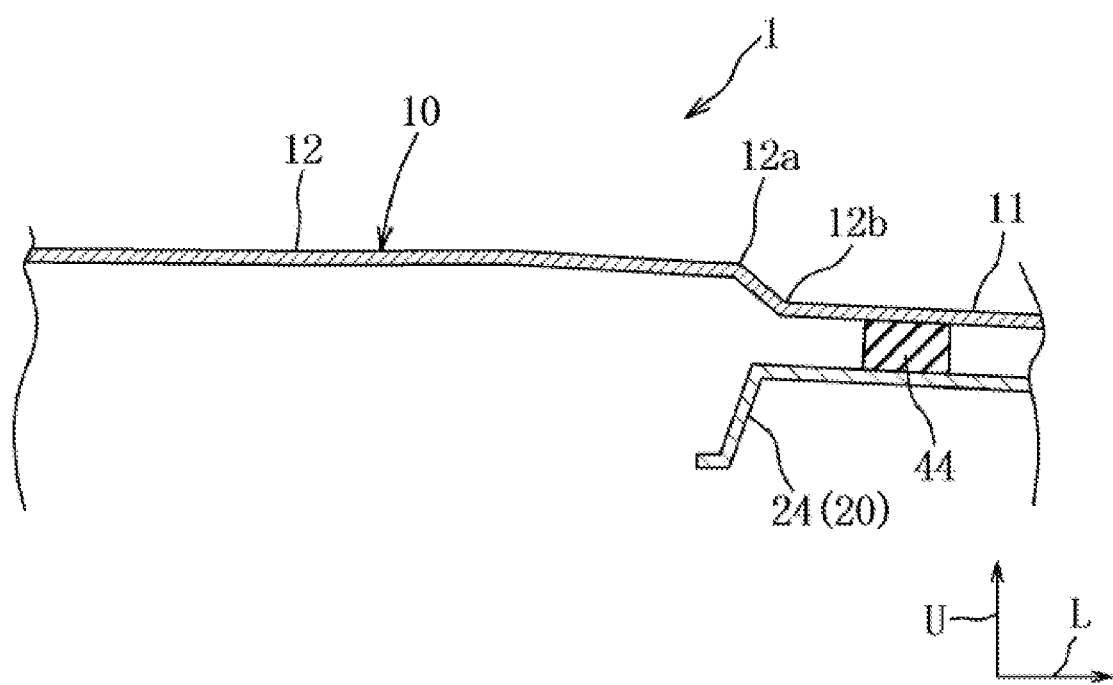
FIG. 4 is a cross-sectional view taken along line IV-IV in FIG. 2.

The pair of first step portions 12 is provided to protrude upward from the base 11 and is formed so as to extend in the front-rear direction. As illustrated in FIG. 4, in the first step portion 12, an upper-side ridge 12*a* extending in the front-rear direction at a boundary between a side wall and an upper wall, and a lower-side ridge 12*b* extending in the front-rear direction at a boundary between the side wall and the base 11 are formed. The up-down dimension of a front-half portion of the first step portion 12 is set to be smaller toward the front side than the base 11, and the up-down dimension of a rear-half portion thereof is set to be smaller toward the rear side than the base 11.

Figure 5:
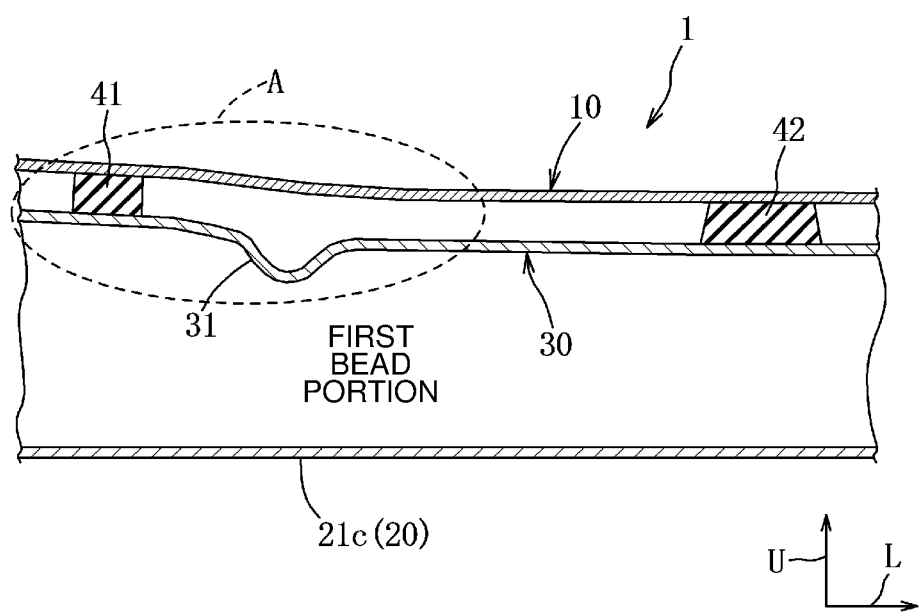
FIG. 5 is a cross-sectional view taken along line V-V in FIG. 2.

Therefore, as illustrated in FIGS. 2 and 5, the first step portion 12 disappears at a front end portion and rear end portion of the outer panel 10. In other words, the upper-side ridge 12*a* and the lower-side ridge 12*b* disappear at the front end portion of the outer panel 10, and an extension line vicinity area A obtained by extending the upper-side ridge 12*a* and the lower-side ridge 12*b* to the front side has the same height (integration) as the base 11 in terms of height dimension.

The pair of second step portions 13 is recessed downward from the base 11 and is formed so as to extend in the front-rear direction. In the second step portion 13, a lower-side ridge extending in the front-rear direction at a boundary between a side wall and a lower wall, and an upper-side ridge extending in the front-rear direction at a boundary between the side wall and the base 11 are uniformly formed from a front end of the outer panel 10 to a rear end thereof. The ridges 12*a* and 12*b* of the first step portion 11 and the ridges of the second step portion 12 are both configured so as to proceed to the vehicle-width-direction outer side toward the rear side.

Next, the inner panel 20 will be described.

Figure 6:
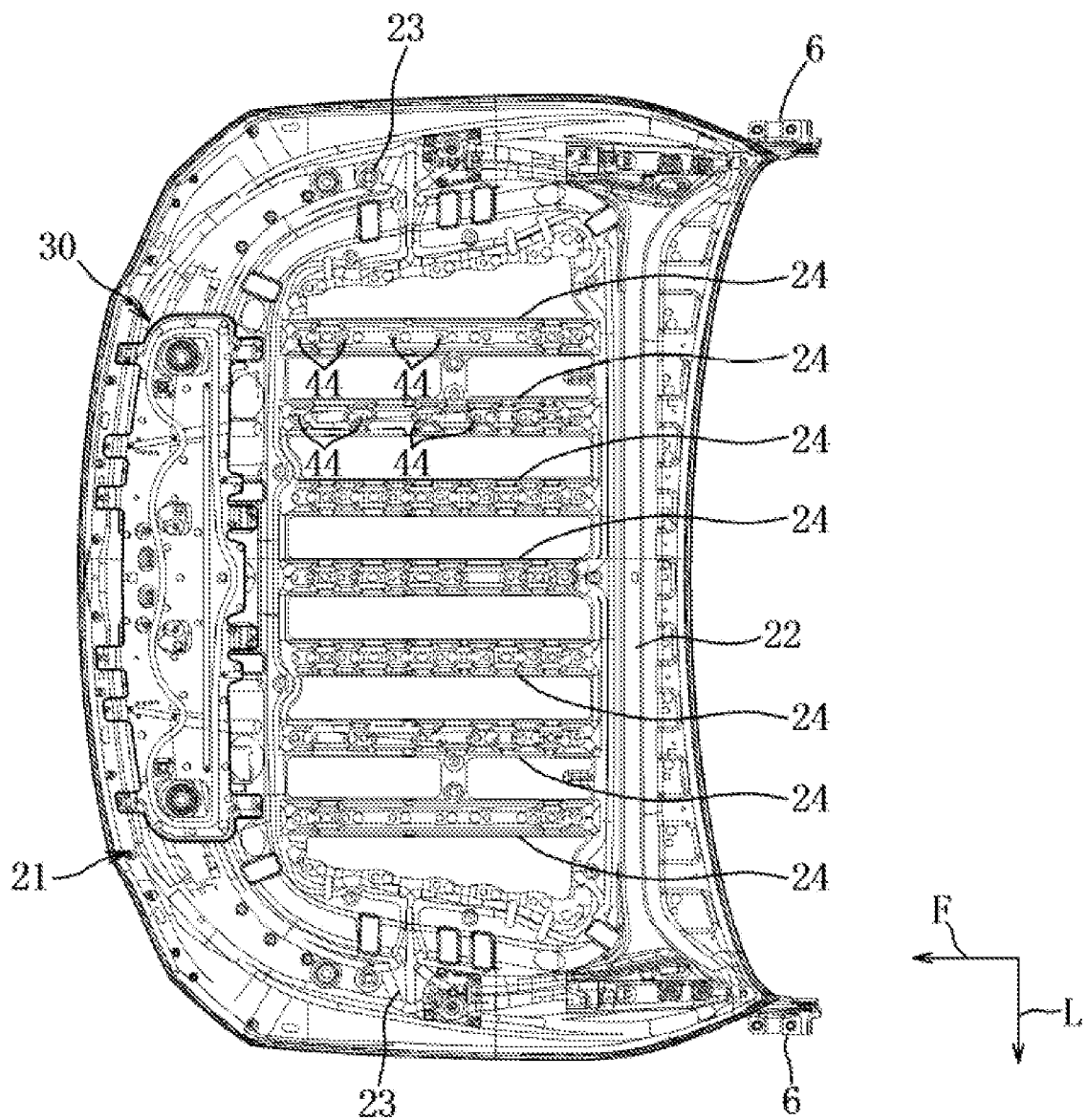
FIG. 6 is a plan view of the bonnet with an outer panel omitted.

The inner panel 20 is molded by, for example, pressing a steel plate material of about 0.50 mm. As illustrated in FIG. 6, the inner panel 20 integrally includes a front frame 21 extending in the left-right direction corresponding to the front end of the outer panel 10, a rear frame 22 extending in the left-right direction corresponding to the rear end of the outer panel 10, a pair of left and right transverse frames 23 connecting left and right ends of the front frame 21 and left and right ends of the rear frame 22 respectively and extending in the front-rear direction, seven inner frames 24 connecting the front frame 21 and the rear frame 22 and extending in the front-rear direction, and the like. The front frame 21, the rear frame 22, and the pair of transverse frames 23 form a partial closed cross-section which continues in an annular shape in cooperation with the outer panel 10 and is partially opened.

As illustrated in FIG. 3, the front frame 21 is formed so as to bulge downward. The front frame 21 includes a front end 21*a* subjected to hemming together with the outer panel 10, a front wall 21*b* which extends so as to bend downward on the rear side from a rear end of this front end 21*a*, a bottom wall 21*c* extending rearward in the substantially horizontal direction from a rear end of this front wall 21*b*, a rear wall 21*d* which extends so as to bend upward on the rear side from a rear end of this bottom wall 21*c*, and the like. At a vehicle-width-direction center of the bottom wall 21*c*, a striker (illustration omitted) capable of engaging with a latch (illustration omitted) provided on the vehicle body side is provided in a state of projecting downward.

Figure 7:
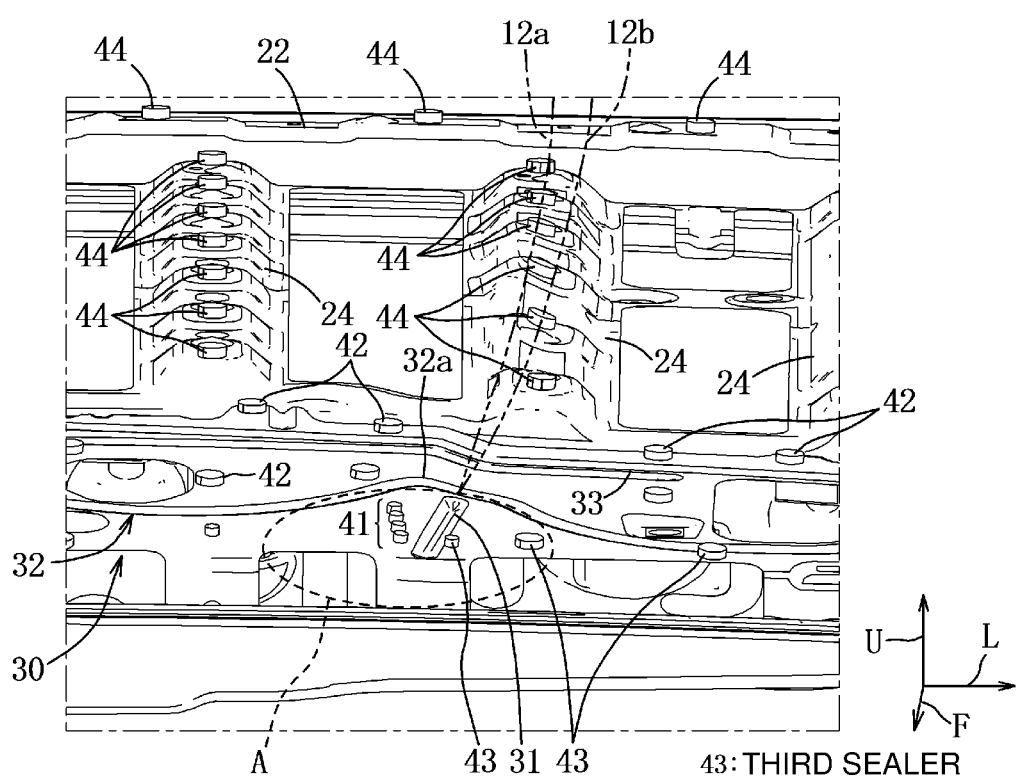
FIG. 7 is a perspective view of a main portion of the bonnet with the outer panel omitted.

As illustrated in FIG. 7, a plurality of first to fourth sealers 41 to 44 are disposed between the outer panel 10 and the inner panel 20. The first to fourth sealers 41 to 44 in a substantially columnar shape are thermosetting epoxy synthetic resin adhesives, for example, mastic sealers.

The first to third sealers 41 to 43 are each filled in a mating face between the outer panel 10 and the stiffener 30, in a closely contacting manner, and the fourth sealer 44 is filled in a mating face between the outer panel 10 and the inner panel 20, in a closely contacting manner. The vehicle V including the bonnet 1 is subjected to a baking process after electropainting. At this time, the filled first to third sealers 41 to 43 are directionally cured from the surface side toward the inside to be held under heating.

The rear frame 22 supports a rear-side lower face of the outer panel 10 via a plurality of (eleven, for example) the fourth sealers 44 arranged in the left-right direction. The fourth sealer 44 has a larger up-down dimension than the first to third sealers 41 to 43.

As illustrated in FIGS. 4, 6, and 7, each of the inner frames 24 is formed in a substantially hat-shaped cross-sectional shape, and the inner frames 24 located at left and right ends each have a front-rear-direction middle portion connected to the inner frame 24 adjacent thereto. As illustrated in FIGS. 3, 4, 6, and 7, the inner frame 24 supports a lower face of a center area of the outer panel 10 via a plurality of (seven, for example) the fourth sealers 44 disposed in the top wall.

Next, the stiffener 30 will be described.

Figure 8:
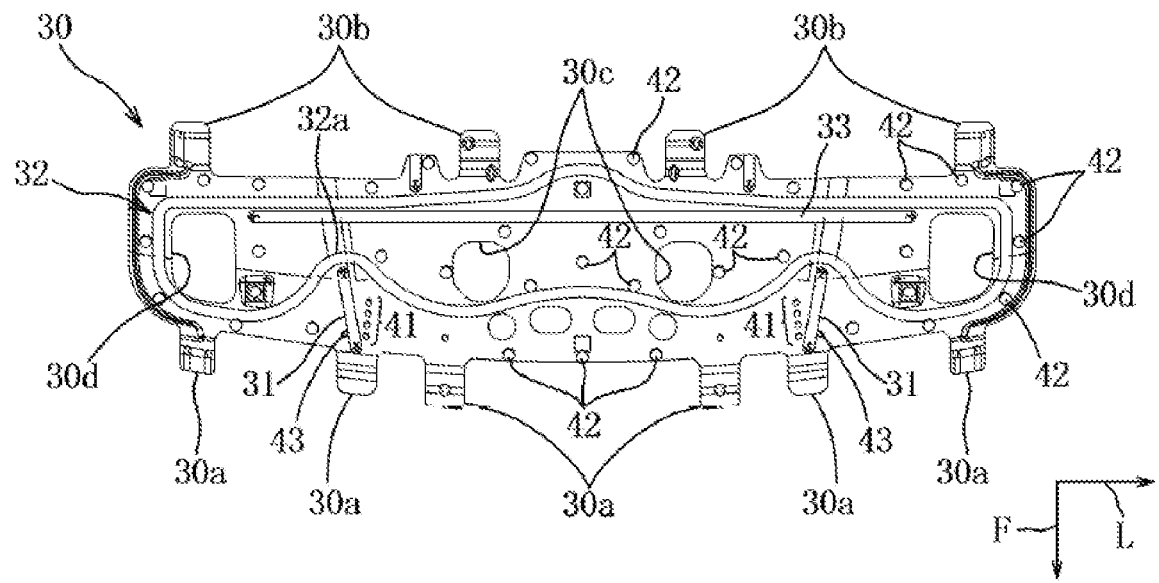
FIG. 8 is a plan view of a stiffener.

The stiffener 30 is molded by, for example, pressing a substantially rectangular steel plate material of about 0.50 mm. As illustrated in FIG. 8, the stiffener 30 includes a plurality of (six, for example) front legs 30*a*, a plurality of (four, for example) rear legs 30*b*, a pair of left and right inner-side openings 30*c* formed at a vehicle-width-direction center portion of the stiffener 30, a pair of left and right outer-side openings 30*d* formed at left and right ends of the stiffener 30 so as to interpose the pair of inner-side openings 30*c* therebetween, and the like. Since this stiffener 30 is configured in a left-right symmetrical manner, a left-half portion thereof will be mainly described hereinafter.

Figure 9:
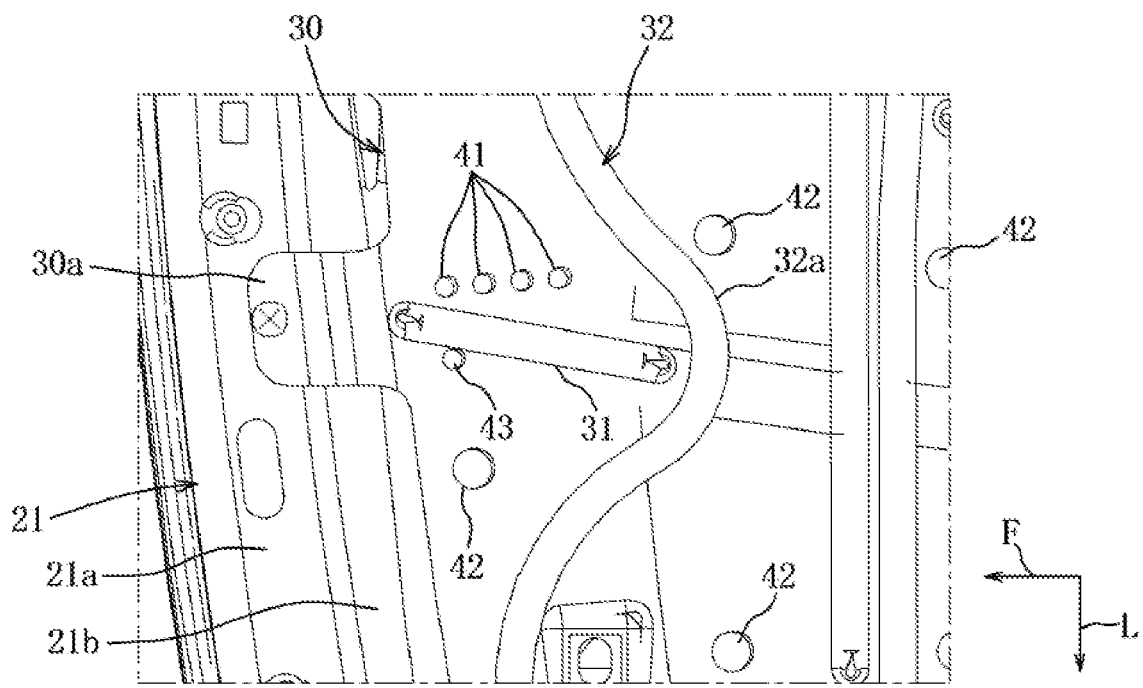
FIG. 9 is a plan view of a main portion of the bonnet with the outer panel omitted.
Figure 10:
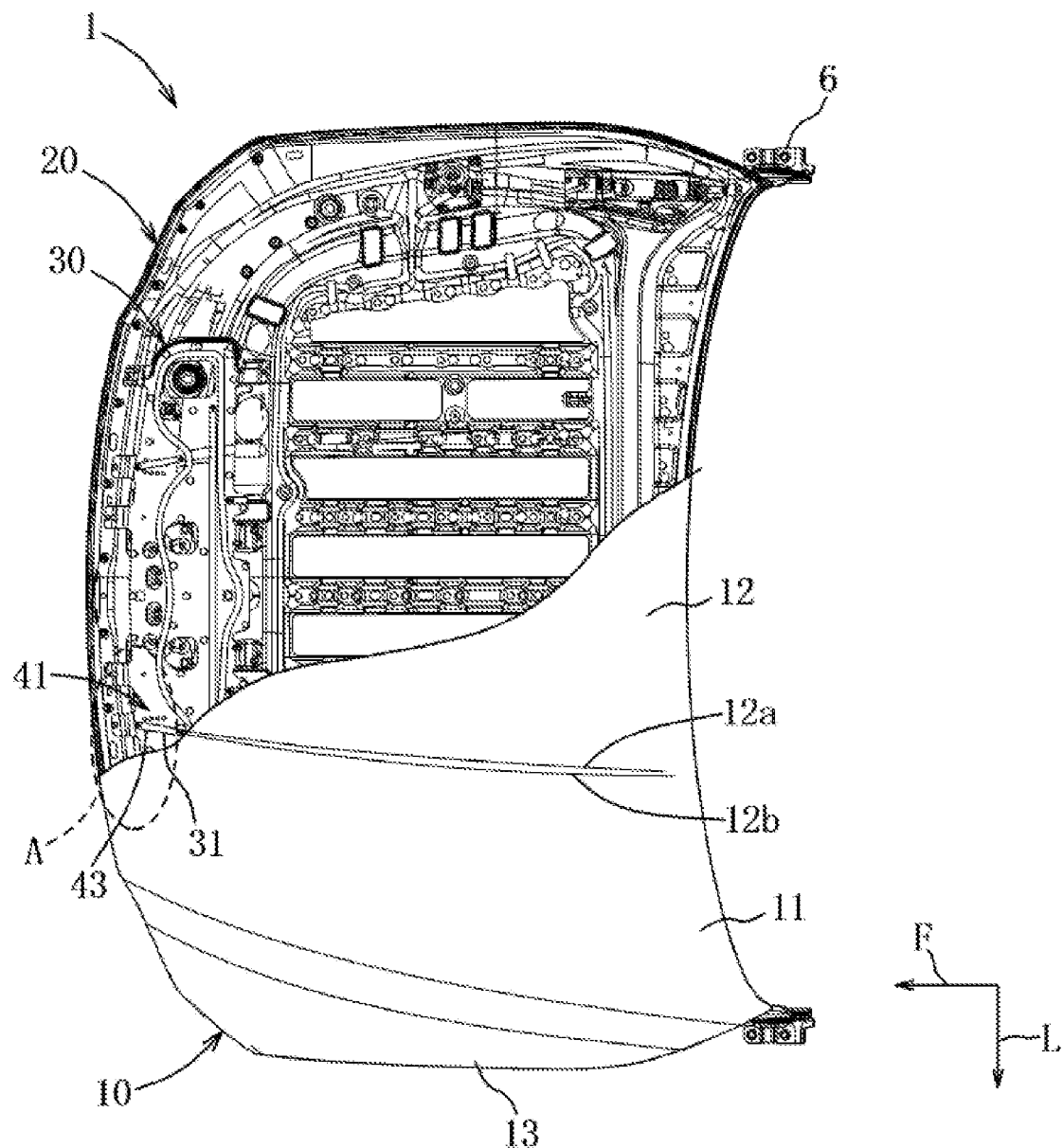
FIG. 10 is a plan view of the bonnet with the outer panel partially cut out.

As illustrated in FIGS. 3 and 9, the front leg 30*a* extends downward on the front side from a front end of the stiffener 30 and then is formed so as to be curved upward on the front side, and a distal end thereof is joined to the front end 21*a* by spot welding. The rear leg 30*b* extends downward on the rear side from a rear end of the stiffener 30 and then is formed so as to be curved upward on the rear side, and a distal end thereof is joined to the rear wall 21*d* by spot welding.

As illustrated in FIGS. 7 to 9, the stiffener 30 is provided with a pair of left and right first bead portions 31 recessed downward and extending in the front-rear direction, an annular second bead portion 32 recessed downward and formed at an outer peripheral edge of the stiffener 30, a third bead portion 33 recessed downward at a rear portion of the stiffener 30 and extending in the left-right direction, and the like.

As illustrated in FIGS. 6 to 10, the pair of first bead portions 31 is disposed below an area corresponding to an extension line obtained by extending a boundary portion of the first step portion (the upper-side ridge 12*a* and the lower-side ridge 12*b*) to the front side, namely, the extension line vicinity area A, and is formed so as to proceed to the vehicle-width-direction outer side toward the rear side. A front end of the first bead portion 31 is formed corresponding to a base of the front leg 30a on the center side of the three front legs 30a on one side.

The second bead portion 32 is formed so as to surround the pair of inner-side openings 30c and the pair of outer-side openings 30d. As illustrated in FIGS. 8 and 9, a front-side portion of the second bead portion 32 is provided with a curved portion 32a curved rearward so as to bypass a rear-half portion of the first bead portion 31. A rear-side portion of the second bead portion 32 is substantially linearly extended in the left-right direction. The third bead portion 33 is close to the rear-side portion of the second bead portion 32 and formed in substantially parallel therewith.

As illustrated in FIGS. 7 to 9, the first to third sealers 41 to 43 are disposed at a top face of the stiffener 30. The first and third sealers 41 and 43 are set to have a diameter equal to or less than ½ of the second sealer 42. Thereby, when a downward load is applied to the upper-side ridge 12a of the first step portion 12, the load is transferred to the stiffener 30 while downward displacement is suppressed by the first sealer 41. The first to third sealers 41 to 43 are set to have substantially the same up-down dimension.

A plurality of the second sealers 42 placed on the stiffener 30 are provided for giving tensile rigidity mainly to the front end portion of the outer panel 10. These second sealers 42 are disposed at the outer peripheral edge of the stiffener 30, outer peripheral edges of the inner-side opening 30c and the outer-side opening 30d, and vicinity portions of the second and third bead portions 32 and 33.

Four first sealers 41 on the stiffener 30, mainly, when a downward load is applied to the upper-side ridge 12a of the first step portion 12, suppresses buckling in an extending manner in the left-right direction which occurs in the extension line vicinity area A. The four first sealers 41 are disposed so as to align in the front-rear direction in a vehicle-width-direction inner-side vicinity area of the first bead portion 31. In other words, the first sealers 41 are disposed in a vicinity area corresponding to the extension line obtained by extending the boundary portion of the first step portion (the upper-side ridge 12a and the lower-side ridge 12b) to the front side. A vehicle-width-direction distance between the first sealers 41 and the first bead portion 31 adjacent thereto is made larger toward the rear side of the first sealers 41, and support rigidity is thereby made higher toward the front side of the first sealers 41 by using a bead effect of the first bead portion 31. Thus, when a downward load is applied to the upper-side ridge 12a of the first step portion 12, a load applied to the four first sealers 41 is substantially equalized.

As illustrated in FIGS. 7 to 9, the third sealer 43 is disposed at a position substantially line symmetrical to the first sealer 41 disposed on the frontmost side of the four first sealers 41 aligning in the front-rear direction with respect to the first bead portion 31. This supports the extension line vicinity area A forming the front end portion of the outer panel 10 which is most separated from the boundary portion of the first step portion 12 toward the front side, so to speak, has low rigidity, in a wide range in the vehicle width direction.

Next, operations and effects of a bonnet structure of the vehicle V will be described.

According to this bonnet structure, the first step portion 12 is, in a vehicle body front view, formed in a vehicle-width-direction inner-side area of the outer panel 10, and the first step portion 12 extends in the vehicle body front-rear direction and is provided in such a manner that a step of the first step portion 12 becomes smaller toward the vehicle body front end side and the step is eliminated at a distal end thereof, so that a character line is formed in the outer panel 10, and designability of the vehicle V can be enhanced.

The stiffener 30 is provided with a load receiving portion (first sealer 41) which abuts against the outer panel 10 along the extension line of the upper-side ridge 12a and lower-side ridge 12b which form the boundary portion of the first step portion 12 and suppresses downward displacement of the outer panel 10, so that the inner panel 20 can support, via the load receiving portion and the stiffener 30, a load propagated on the upper-side ridge 12a of the first step portion 12 and intensively released in the extension line vicinity area A obtained by extending the upper-side ridge 12a of the first step portion 12 to the distal end side, and buckling of the outer panel 10 in an extending manner in the vehicle width direction which occurs in the extension line vicinity area A can be suppressed.

The load receiving portion is the plurality of first sealers 41, so that support rigidity of the extension line vicinity area A of the first step portion 12 can be secured by using the mastic sealer, which is a thermosetting synthetic resin adhesive.

The stiffener 30 includes the plurality of second sealers 42 abutting against the outer panel 10, and the first sealer 41 is smaller than the second sealer 42, so that the extension line vicinity area A of the first step portion 12 can be supported by the first sealer 41 having a smaller displacement amount than the second sealer 42, and the support rigidity of the extension line vicinity area A can be further increased.

The stiffener 30 has the first bead portion 31 extending in the front-rear direction at a position in the vicinity of the plurality of first sealers 41, so that a load acting via the plurality of first sealers 41 can be firmly supported by using the bead effect of the first bead portion 31.

The vehicle-width-direction distance between the plurality of first sealers 41 and the first bead portion 31 is set so as to become smaller toward the front side of the first sealers 41, so that the support rigidity of the plurality of first sealers 41 can be adjusted by using the vehicle-width-direction distance between the plurality of first sealers 41 and the first bead portion 31, and a load applied to the plurality of first sealers 41 can be equalized.

The stiffener 30 has the third sealer 43, and the third sealer 43 is disposed at a position substantially symmetrical to, of the plurality of first sealers 41, the first sealer 41 disposed on the frontmost side of the first bead portion 31, so that the front end portion of the outer panel 10 which is most separated from the first step portion 12 in the front-rear direction and has low rigidity can be supported in a wide range in the vehicle width direction, and dent resistance can be enhanced.

The continuous frame-shaped second bead portion 32 is formed at the outer peripheral edge of the stiffener 30, and the curved portion 32a is formed at the front-side portion of the second bead portion 32 which is curved toward the rear side so as to bypass the first bead portion 31, so that, while the support rigidity of the first sealer 41 is maintained, rigidity of the stiffener 30 can be secured.

Next, a modification in which the embodiment is partially changed will be described.

1) Although in the embodiment, description has been made for the example in which the engine room R is formed at a vehicle body front portion on the front side of the vehicle cabin C and the up-down dimension of the first step portion 12 is made smaller toward the front side, application to the vehicle V is also possible in which the engine room R is formed at a vehicle body rear portion on the rear side of the vehicle cabin C. In this case, the up-down dimension of the first step portion is made smaller toward the rear side, and the extension line vicinity area is formed at the rear end of the bonnet.

2) Although in the embodiment, description has been made for the example of the four columnar first sealers 41, there may be equal to or less than three, or may be equal to or more than five. Furthermore, in the present embodiment, description has been made by using a configuration before the baking process, and it is possible to achieve the effect of the present case even when the plurality of first sealers 41 are partially connected after the baking process. Furthermore, a substantially line-shaped first sealer may be disposed by using the configuration before the baking process.

3) Although in the embodiment, description has been made for the example in which the load receiving portion is formed by the mastic sealer, it is sufficient that the load receiving portion, at least, when a downward load is applied to the upper-side ridge 12a of the first step portion 12, intervenes between the outer panel 10 and the stiffener 30 and transfers the load to the stiffener 30, and an adhesive other than the mastic sealer may be used. Furthermore, instead of the adhesive, an interposing member may be disposed.

4) In addition to the above, those skilled in the art can implement a mode in which various changes are added to the embodiment or a mode in which the embodiments are combined, without departing from the gist of the present disclosure, and the present disclosure also includes such variations.

What is claimed is:

1. A vehicle bonnet structure comprising:
   an outer panel provided so as to cover a room from above and form an exterior design, the room being formed on at least one side of a vehicle cabin in a vehicle body front-rear direction;
   an inner panel attached to a back face of this outer panel; and
   a reinforcement member disposed between a vehicle body front-rear-direction close-to-distal end portion of the outer panel and a vehicle body front-rear-direction close-to-distal end portion of the inner panel and supported on the inner panel, the vehicle bonnet structure being configured such that
   a step portion is, in a vehicle body front view, formed in a vehicle-width-direction inner-side area of the outer panel,
   the step portion extends in the vehicle body front-rear direction and is provided in such a manner that a step of the step portion becomes smaller toward a vehicle body front-rear-direction distal end side or the step is eliminated at the distal end, and
   the reinforcement member comprises a load receiving portion abutting against the step portion and the outer panel along an extension line toward a distal end side of the step portion to suppress downward displacement of the outer panel, wherein
   the load receiving portion is a plurality of first mastic sealers,
   the reinforcement member comprises a plurality of second mastic sealers abutting against the outer panel,
   the first mastic sealer is smaller than the second mastic sealer, and
   the reinforcement member comprises a first bead portion extending in the vehicle body front-rear direction at a position in a vicinity of the plurality of first mastic sealers.

2. A vehicle bonnet structure comprising:
   an outer panel provided so as to cover a room from above and form an exterior design, the room being formed on at least one side of a vehicle cabin in a vehicle body front-rear direction;
   an inner panel attached to a back face of this outer panel; and
   a reinforcement member disposed between a vehicle body front-rear-direction close-to-distal end portion of the outer panel and a vehicle body front-rear-direction close-to-distal end portion of the inner panel and supported on the inner panel, the vehicle bonnet structure being configured such that
   a step portion is, in a vehicle body front view, formed in a vehicle-width-direction inner-side area of the outer panel,
   the step portion extends in the vehicle body front-rear direction and is provided in such a manner that a step of the step portion becomes smaller toward a vehicle body front-rear-direction distal end side or the step is eliminated at the distal end, and
   the reinforcement member comprises a load receiving portion abutting against the step portion and the outer panel along an extension line toward a distal end side of the step portion to suppress downward displacement of the outer panel, wherein
   the load receiving portion is a plurality of first mastic sealers,
   the plurality of first mastic sealers are thermosetting epoxy synthetic resin adhesives, and
   the plurality of first mastic sealers are each filled in a mating face between the outer panel and the reinforcement member.

3. The vehicle bonnet structure according to claim 2, wherein
   the reinforcement member comprises a plurality of second mastic sealers abutting against the outer panel, and
   the first mastic sealer is smaller than the second mastic sealer.

4. The vehicle bonnet structure according to claim 3, wherein
   the reinforcement member comprises a first bead portion extending in the vehicle body front-rear direction at a position in a vicinity of the plurality of first mastic sealers.

5. The vehicle bonnet structure according to claim 4, wherein
   a vehicle-width-direction distance between the plurality of first mastic sealers and the first bead portion is set so as to become smaller toward the vehicle body front-rear-direction distal end side.

6. The vehicle bonnet structure according to claim 5, wherein
   the reinforcement member comprises a third mastic sealer, and
   the third mastic sealer is disposed at a position substantially symmetrical to, of the plurality of first mastic sealers, one of the first mastic sealers that is disposed on a vehicle body front-rear-direction most distal end side of the first bead portion.

7. The vehicle bonnet structure according to claim 6, wherein
   a continuous frame-shaped second bead portion is formed at an outer peripheral edge of the reinforcement member, and
   a curved portion is formed at a vehicle body front-rear-direction distal end side portion of the second bead portion, the curved portion being curved toward a vehicle body front-rear-direction center side so as to bypass the first bead portion.

8. The vehicle bonnet structure according to claim 4, wherein
the reinforcement member comprises a third mastic sealer, and
the third mastic sealer is disposed at a position substantially symmetrical to, of the plurality of first mastic sealers, one of the first mastic sealers that is disposed on a vehicle body front-rear-direction most distal end side of the first bead portion.

9. The vehicle bonnet structure according to claim 4, wherein
a continuous frame-shaped second bead portion is formed at an outer peripheral edge of the reinforcement member, and
a curved portion is formed at a vehicle body front-rear-direction distal end side portion of the second bead portion, the curved portion being curved toward a vehicle body front-rear-direction center side so as to bypass the first bead portion.

10. The vehicle bonnet structure according to claim 5, wherein
a continuous frame-shaped second bead portion is formed at an outer peripheral edge of the reinforcement member, and
a curved portion is formed at a vehicle body front-rear-direction distal end side portion of the second bead portion, the curved portion being curved toward a vehicle body front-rear-direction center side so as to bypass the first bead portion.

11. The vehicle bonnet structure according to claim 1, wherein
the plurality of first mastic sealers are thermosetting epoxy synthetic resin adhesives, and
the plurality of first mastic sealers are each filled in a mating face between the outer panel and the reinforcement member.

12. The vehicle bonnet structure according to claim 1, wherein
the reinforcement member is a stiffener molded by pressing a substantially rectangular steel plate material.

13. The vehicle bonnet structure according to claim 1, wherein
the reinforcement member is a stiffener including a plurality of front legs, a plurality of rear legs, a pair of left and right inner-side openings formed at a vehicle-width-direction center portion of the stiffener, and a pair of left and right outer-side openings formed at left and right ends of the stiffener so as to interpose the pair of inner-side openings.

14. The vehicle bonnet structure according to claim 1, wherein
the reinforcement member is a stiffener including a pair of left and right first bead portions recessed downward and extending in the front-rear direction, an annular second bead portion recessed downward and formed at an outer peripheral edge of the stiffener, and a third bead portion recessed downward at a rear portion of the stiffener and extending in the left-right direction.

15. The vehicle bonnet structure according to claim 2, wherein
the reinforcement member is a stiffener molded by pressing a substantially rectangular steel plate material.

16. The vehicle bonnet structure according to claim 12, wherein
the reinforcement member is a stiffener including a plurality of front legs, a plurality of rear legs, a pair of left and right inner-side openings formed at a vehicle-width-direction center portion of the stiffener, and a pair of left and right outer-side openings formed at left and right ends of the stiffener so as to interpose the pair of inner-side openings.

17. The vehicle bonnet structure according to claim 15, wherein
the reinforcement member is a stiffener including a plurality of front legs, a plurality of rear legs, a pair of left and right inner-side openings formed at a vehicle-width-direction center portion of the stiffener, and a pair of left and right outer-side openings formed at left and right ends of the stiffener so as to interpose the pair of inner-side openings.

18. A vehicle bonnet structure comprising:
an outer panel provided so as to cover a room from above and form an exterior design, the room being formed on at least one side of a vehicle cabin in a vehicle body front-rear direction;
an inner panel attached to a back face of this outer panel; and
a reinforcement member disposed between a vehicle body front-rear-direction close-to-distal end portion of the outer panel and a vehicle body front-rear-direction close-to-distal end portion of the inner panel and supported on the inner panel, the vehicle bonnet structure being configured such that
a step portion is, in a vehicle body front view, formed in a vehicle-width-direction inner-side area of the outer panel,
the step portion extends in the vehicle body front-rear direction and is provided in such a manner that a step of the step portion becomes smaller toward a vehicle body front-rear-direction distal end side or the step is eliminated at the distal end, and
the reinforcement member comprises a load receiving portion abutting against the step portion and the outer panel along an extension line toward a distal end side of the step portion to suppress downward displacement of the outer panel,
wherein the reinforcement member is a stiffener including a plurality of openings.

19. The vehicle bonnet structure according to claim 18, wherein
the load receiving portion is a plurality of first mastic sealers,
the plurality of first mastic sealers are thermosetting epoxy synthetic resin adhesives, and
the plurality of first mastic sealers are each filled in a mating face between the outer panel and the reinforcement member.

20. The vehicle bonnet structure according to claim 18, wherein
the reinforcement member includes a plurality of front legs and a plurality of rear legs, and the plurality of openings comprises a pair of left and right inner-side openings formed at a vehicle-width-direction center portion of the stiffener, and a pair of left and right outer-side openings formed at left and right ends of the stiffener so as to interpose the pair of inner-side openings.

* * * * *